INVENTOR.
Joe Crites
Alexander Bogot
Lorenz J. Andresen

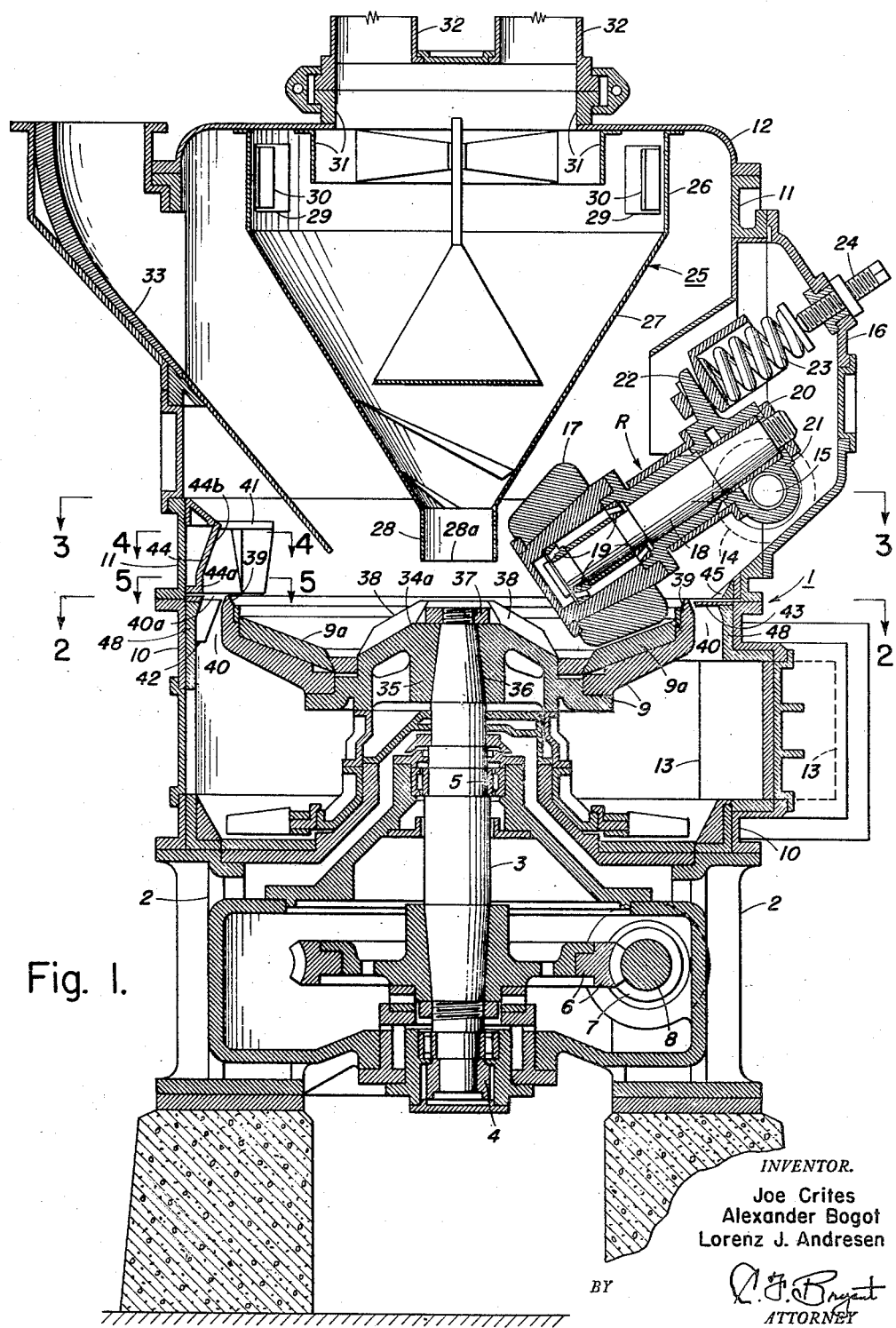
Fig. I.
INVENTOR.
Joe Crites
Alexander Bogot
Lorenz J. Andresen

Dec. 28, 1954  J. CRITES ET AL  2,698,142
BOWL MILL WITH NOVEL BOWL AND AIR FLOW DIRECTING MEANS
Filed Feb. 3, 1953  3 Sheets-Sheet 3

INVENTOR.
Joe Crites
Alexander Bogot
Lorenz J. Andresen

BY
ATTORNEY

United States Patent Office 2,698,142
Patented Dec. 28, 1954

2,698,142

BOWL MILL WITH NOVEL BOWL AND AIR FLOW DIRECTING MEANS

Joe Crites, Larchmont, and Alexander Bogot, Hastings on Hudson, N. Y., and Lorenz J. Andresen, Chicago, Ill., assignors to Combustion Engineering, Inc., New York, N. Y., a corporation of Delaware Application February 3, 1953, Serial No. 334,922

9 Claims. (Cl. 241—53)

This invention relates to pulverizing mills and has specific relation to an improved bowl mill for pulverizing coal and like materials.

The pulverizing mill of this invention is of the type having an upwardly open bowl which is rotatable about its central axis within a closed housing. One or more grinding rollers, each freely rotatable about its own axis, are supported within the housing so as to be forced under pressure toward the grinding surface provided on the inner wall of the bowl to grind material between this surface and the rollers, during which action the rollers rotate about their axes. The material to be ground is delivered, via a conduit projecting through the housing, toward the central portion of the bowl and is thence moved by centrifugal force, due to the rotation of the bowl, radially toward the grinding surface where it is subjected to the grinding action of the roller or rollers.

The periphery of the bowl is spaced from the housing forming an annular passage therebetween through which air is caused to flow upwardly to entrain the ground material leaving the edge of the bowl. The material laden air passes through a separator centrally located within the housing directly above the bowl and wherein the insufficiently ground material is separated out and returned through a spout onto the central portion of the bowl for grinding.

Suitable deflecting means are positioned on the interior of the housing above the bowl rim and directly over the annular passage to deflect coarse material that passes over the rim of the bowl and becomes entrained in the air stream back into the bowl for further treatment.

In the operation of prior art mills, some of the material deposited centrally of the bowl would not rotate with the bowl and would build up in a pile toward the outlet of the separator to the point where it covered this outlet greatly interfering with the proper functioning of the separator. Because of this piling up of material the bowl would remain substantially full during operation of the mill with the material covering the rolls and filling the space between adjacent rolls all of which caused the mill to rumble and chatter with increased fineness of grinding and the power input to the mill to be rather high and to fluctuate over a considerable range. Furthermore, an excessive quantity of coarse fractions of the material passed over the rim of the bowl and fell downward through the annular passage between the bowl and the housing to the lower portion of the housing below the bowl where it had to be removed.

It is the general object of this invention to provide a bowl mill of improved design and increased efficiency.

It is a further object to provide a bowl mill that is free of this objectionable piling up of the material in the bowl.

It is another object to provide a bowl mill with means effective to prevent excess spillage of coarse material into the housing below the bowl and to deflect coarse fractions of the material toward the nearest roller.

Other and further objects of the invention will become apparent to those skilled in the art from the detailed description thereof when taken in conjunction with the accompanying drawings wherein:

Figure 1 is a vertical section, taken along line 1—1 of Fig. 3 through a mill embodying the invention.

Figure 4:
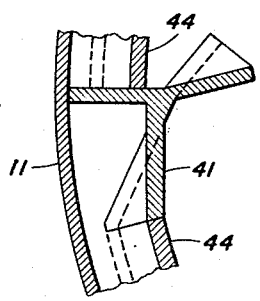
Figure 5:
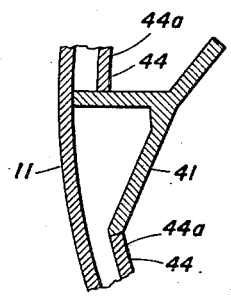

Figures 4 and 5 are typical sections through the deflectors taken on lines 4—4 and 5—5, respectively, of Fig. 1.

Figure 3:
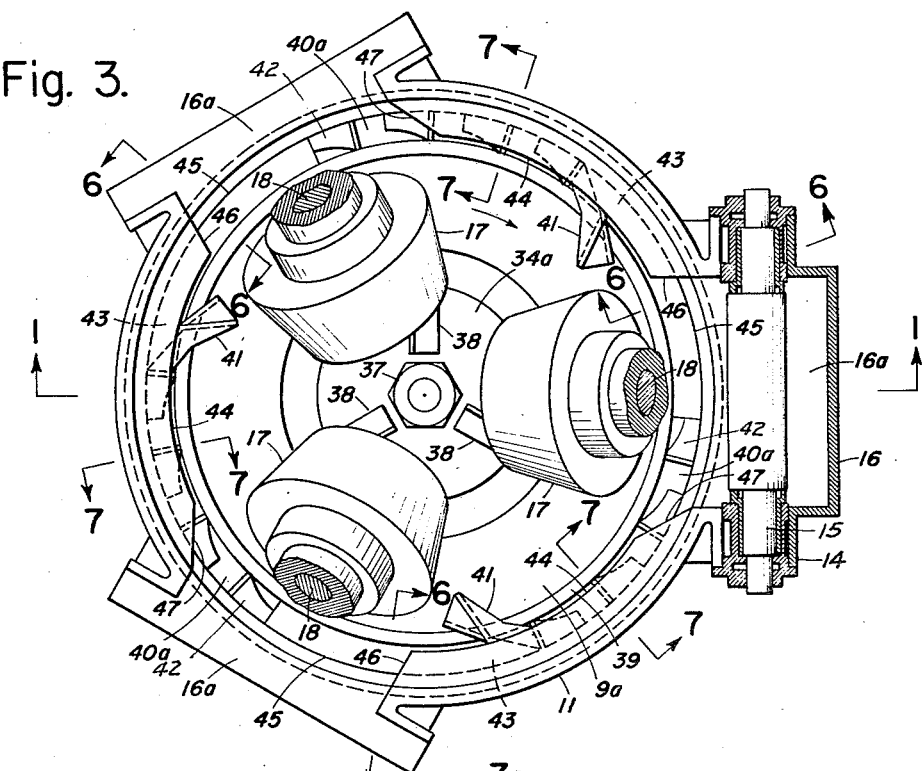
Figure 3 is a transverse section taken on line 3—3 of Fig. 1.
Figure 2:
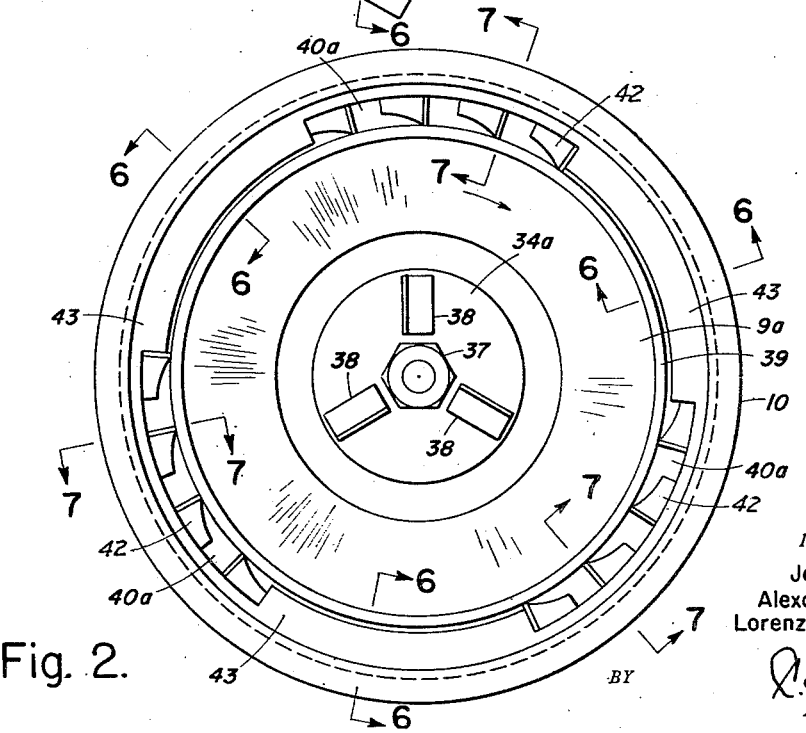
Figure 2 is a transverse section taken on line 2—2 of Fig. 1.
Figure 6:
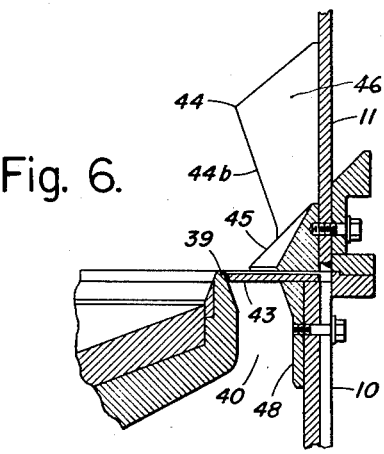
Figure 7:
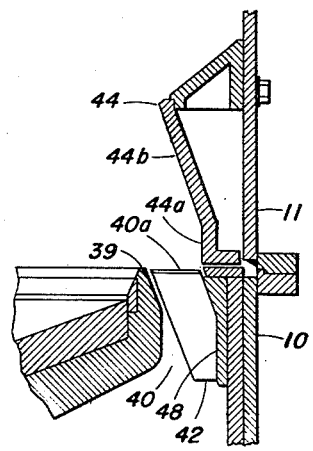

Figures 6 and 7 are transverse sections taken on lines 6—6 and 7—7, respectively, of Figs. 2 or 3 showing the mill housing deflector liners adjacent the bowl.

The mill housing generally designated as 1 (Fig. 1), comprises a base 2 within which is mounted a vertical shaft 3, supported in bearings 4 and 5, and having secured to its lower end worm wheel 6 which engages worm 7 mounted on motor driven shaft 8. Rotation of shaft 8 accordingly rotates bowl 9 that is mounted on the upper edge of the shaft 3.

Mounted on the base 2 are superimposed housing portions 10 and 11. The uppermost portion 11 is capped by a cover 12 and the middle portion 10 contains an opening 13 for the admission of air into the mill. Supported within upper portion 11 is bearing assembly 14 which rotatably supports roller assembly R through shaft 15 which is received within the bearing assembly. Access to and removal of roller assembly R from the housing is had through opening 16a in housing 11, this opening normally being closed by cover 16.

There may be one or more roller assemblies R, depending on the size of the mill, and in the illustrative and preferred embodiment shown, three such assemblies are employed. Each roller assembly R includes the roller 17 rotatably supported by bearings 19 on shaft 18 which is mounted within the tapered portion 20 of hub 21 (Fig. 1). The hub 21 is secured to shaft 15 and has an arm 22 against which one end of spring 23 bears to urge the hub 21 and therewith the shaft 18 and the roller 17 in a counterclockwise direction about the axis of the shaft. A set screw 24 passing through the cover 16 bears against the other end of the spring 23 to vary its compression.

Depending from cover 12 is the classifier 25 which has a cylindrical wall 26 at its upper portion from which depends conical wall 27 having a cylindrical wall 28 connected to its lower end and forming a bottom outlet 28a for the passage of rejected, insufficiently ground material into the center of bowl 9. A multiplicity of openings 29 in the upper wall 26 admit the material laden air into the classifier 25 and adjustable deflector vanes 30 positioned in these openings direct the mixture of air and material at desired angles to cause a vortical rotation of the mixture as it passes through the classifier. The air and sufficiently fine material entrained by the air pass through outlet 31 provided in cover 12 and into ducts 32 which convey this mixture of sufficiently fine material and air to a point of use.

A chute 33 is fastened to the housing 11 and extends from a material feeder, not shown, downwardly and inwardly into the mill to a point adjacent the bottom wall 28 of the classifier 25. The material to be ground is delivered via this chute 33 onto the central portion of the bowl 9 adjacent the rejected material deposited in the bowl through outlet 28a of the classifier.

In bowl 9 of Fig. 1 a hub 35 extends downwardly from the central portion of the bowl and is provided with a tapered bore 36 that fits onto the tapered end of a shaft 3 being held in place by nut 37.

As best shown in Fig. 1, the top central surface portion 34a of bowl 9 is in the form of a truncated cone with the sloping sides of the cone provided with a multiplicity of upwardly extending radial vanes 38. Positioned outwardly of the central portion is grinding ring 9a which slopes upwardly and outwardly to a vertically extending lip 39 around the periphery of the bowl. The lip 39 is spaced from the inner face of the housing portion 10 forming annular space 40 therebetween through which air from inlet opening 13 flows upwardly to convey the ground material that passes over the lip upward through the mill interior and into the classifier 25.

A plurality of deflectors 41 (Figs. 1 and 3) are positioned at spaced intervals circumferentially about the housing portion 11 closely above the rim of bowl 9 formed by lip 39. Each deflector 41 is positioned immediately ahead of a roll 17 (Fig. 3) with respect to the bowl's rotation and is shaped to deflect the material discharged over the bowl rim generally inwardly and downwardly toward the lower portion of the associated roll 17. The shape of each deflector 41 is best shown by Figs. 4 and 5 and is the shape found most effective to deflect the material as explained above.

The annular space 40 is in open communication with the mill interior above the bowl 9, through arc shaped openings 40a (Figs. 1, 2, 3, 7) each of which is about equal in length to one sixth of the bowl's circumference, as best shown in Fig. 2, and is positioned immediately in front of a deflector 41. Positioned in annular passage 40 directly below the openings 40a are air vanes 42 fastened to the mill housing liner portion 48 and inclined to cause the air leaving the annular space 40 to rotate in the direction of the rotation of bowl 9 (Fig. 2).

The annular space 40 intermediate the openings 40a is substantially closed off from communication with the mill interior above the bowl 9 by arch shaped restricting plates 43 (Figs. 1, 2, 3 and 6) extending radially inward from the mill housing portion 10 to within a close clearance with the bowl rim 39. Each restricting plate 43 extends circumferentially beneath a deflector 41 to a point slightly beyond the axis or center of associated roller 17. The air flowing upwardly through the annular space 40 is thereby concentrated to flow through openings 40a and is directed by vanes 42 toward the deflectors 41.

It has been found in the operation of bowl mills that the major portion of the material that is being discharged over the rim of the bowl is discharged in the arcs immediately following each of the rolls and extending to within a predetermined distance of the next succeeding roll relative to the direction of rotation of the bowl, this being the arc occupied by the opening 40a. The major portion of material therefor meets the air streams passing upwardly through the openings 40a and as this material travels in the direction of the bowls rotation it is assisted by the air to move circumferentially and upwardly.

Some of this material, particularly the heavier particles, will strike the deflectors 41 and be directed thereby against and under the associated roll 17 to be reground while the remaining material will be carried by the air inwardly and upwardly into the mill interior. During the travel of this material upwardly within the mill interior an initial separation of coarse and fine fractions takes place through the influence of gravity, some of the coarse fractions falling into the bowl 9 to be reground while the remainder pass with the air into the separator 25 where a final separation is effected as explained hereinbefore.

Secured to the inner surface of the wall of housing portion 11 and extending above the plane containing the rim of bowl 9 are the arcuate liners 44 each of which extends between adjacent edges of adjacent openings 16a formed in housing portion 11. Each of the liners 44 is provided with an upstream edge 47 and a downstream edge 46 (relative to the direction of rotation of bowl 9), with the upstream edge being inclined as shown in Fig. 3 to deflect material inwardly of the bowl. The lower portion 44a of the inner face of liners 44 (Figs. 1 and 7) extends vertically upward for a distance above the bowl rim 39 and then joins upper portion 44b which slopes upwardly and inwardly. Intermediate each of the liners 44 is positioned a liner 45 which extends beneath the lower edge of opening 16a from the downstream edge 46 to the upstream edge 47 of adjacent liners 44 and is secured to the inner face of housing portion 12. As is evident from Fig. 3 liners 45 thus correspond circumferentially with a substantial portion of the air opening 40a.

It has been determined that the surface 44a of the liners 44 and against which the major portion of the material leaving the bowl impinges, must be vertical in order to properly deflect the material. If this lower surface 44a is a continuation of the upper inclined surface 44b, the heavier material is deflected downwardly into the annular passage 40 resulting in an excess spillage into the base 10 while if this lower surface 44a is sloped outwardly there will be a pocket formed at the intersection of this surface with surface 44b within which some of the material will lodge causing interference with the effective upward flow of the material and air. The liners 44, together with upwardly flowing air streams through the openings 40a, cause the material which overflows the bowl rim 39 and rotates in the direction of the rotation of bowl 9 to rise generally upwardly and inwardly toward the mill interior to thereby minimize the objectionable spillage downwardly through the annular space 40 to the bottom of the mill housing.

The air passing through annular space 40 beneath openings 40a is deflected by the upwardly and inwardly sloping surfaces provided at the upper portion of liners 48 which surfaces are parallel with the upper portion of the periphery of bowl 9.

In operation, the material to be ground is fed into the mill in controlled amounts by a feeder, not shown, which is mounted at the inlet of chute 33. The feeder may be of the known type which serves as a practical seal between the outside pressure and that within the mill.

The material is delivered by chute 33 adjacent the center of rotating bowl 9. Because of vanes 38 and sloping side 34a of the middle truncated cone portion of the bowl the material deposited in the center of the bowl is immediately propelled outwardly onto the grinding ring 9a. The rotation of the bowl 9 then carries the material in the direction of its rotation to the next adjacent roll 17, which crushes it and causes a substantial portion to overflow the bowl rim or lip 39 into the air stream flowing upwardly through the openings 40a.

The material leaving the rim 39 moves outwardly from the rim and at the same time rotatively with the bowl and is conveyed upwardly by the air current passing through openings 40a. A portion of this overflowing material strikes the deflector vanes 41 and is thus directed inwardly so that the coarser, heavier particles thereof fall generally against the lower portion of the successive roll 17 to be reground, while the remaining portion is carried inwardly and upwardly into the mill interior. In passing upwardly through the mill interior a preliminary separation of the coarse and fine fractions is had with some of the coarse fractions falling into the bowl 9 to be reground while the remaining portion of the material is carried by the air stream into the separator 25 where a final separation is effected.

The shape of the liners 44 above openings 40a prevent objectionable spillage of material into the base 10 for the reasons explained hereinbefore. The shape of the faces of the liners 48 and of the periphery of bowl 9 cause the air flowing upwardly through openings 40a together with the material which it picks up to travel inwardly of the mill housing.

In the classifier 25 the adjustable deflector vanes 30 in the inlet openings 29 direct the mixture of air and ground material at a desired angle to cause a vortical rotation of the mixture in its passage through the classifier. By adjusting the angularity of the vanes 30, the effectiveness of the separation can be regulated, within limits, so that material of a desired fineness passes through the outlet 31 while the coarser fractions are returned to the bowl through outlet 28a in the bottom of the classifier, being deposited centrally of the bowl 9 and immediately propelled outwardly toward the grinding ring 9a.

With the novel bowl of the present invention together with the uniquely formed and particularly arranged vanes, deflectors and air passages, a pulverizing mill has been produced whose performance and efficiency is unapproachable by comparable prior art mills and which has the following advantages over such prior art mills:

The power input fluctuates only from 3% to 5% when operating at full load as compared with 10% to 15% heretofore obtained.

The bowl does not run full of material with the rolls covered with material as was previously the case.

The rumble and chatter heretofore produced with increasing fineness is eliminated.

The response to feed change is very rapid as compared with the sluggish response heretofore obtained.

The erratic operation which heretofore was prevalent is eliminated.

The input power to the mill for the same output is reduced approximately 10%.

The pressure drop across the mill is reduced 15% to 20% with a better classification being obtained.

Wear of the grinding ring is even as compared with the excessive wear heretofore experienced at the outer portion of the ring.

From the foregoing it is evident that the pulverizing mill of the invention is vastly superior to previously known mills of a similar type and eliminate many undesirable features found in such known mills.

While a preferred embodiment of the novel pulverizing mill of the present invention has been shown and described it is to be understood that such is merely illustrative and not restrictive, and that variations and modifications may be made therein without departing from the spirit and scope of the invention.

What is claimed is:

1. In a pulverizing mill of the type described the combination of an upright housing through which air is adapted to flow in an upward direction, a grinding bowl mounted within said housing for rotation about its vertically disposed longitudinal axis, said bowl having its periphery spaced from the housing wall to form an annular passage for the upward flow of air, a plurality of symmetrically arranged grinding rollers disposed to cooperate with a grinding surface formed on the inner surface of said bowl to grind material therebetween, deflector members mounted on said housing above and closely adjacent said annular passage, said deflector members being positioned immediately before each of the rollers relative to the direction of rotation of the bowl and including a wall that extends inwardly and in the direction of rotation of the bowl and is vertically tilted so that material that is entrained in the upwardly flowing air and is moving in the direction of rotation of the bowl will be directed downwardly and inwardly toward the lower portion of the associated roller upon striking said wall, and circumferential liners secured to the wall of the housing and positioned above and adjacent to said annular passage, said liners extending generally intermediate adjacent rollers and being formed with an inner surface the lower portion of which is vertical and connects with the outer wall of the annular passage and the upper portion of which slopes inwardly from said lower portion causing the upwardly flowing air and entrained material to be deflected inwardly of the housing.

2. The organization defined by claim 1 wherein the upper portion of the periphery of the bowl slopes upwardly and inwardly and a liner forms the inner wall of the annular passage and has its upper surface generally parallel with the upper portion of said periphery.

3. A pulverizing mill comprising an upright housing through which air is adapted to flow in an upward direction, a grinding bowl mounted within said housing for rotation about its vertically disposed longitudinal axis, said bowl having its periphery spaced from the housing wall to form an annular passage for the upward flow of air, a plurality of symmetrically arranged grinding rollers disposed to cooperate with a grinding surface formed on the inner surface of said bowl to grind material therebetween, deflector members mounted on said housing above and closely adjacent said annular passage, said deflectors being positioned immediately before each of the rollers relative to the direction of rotation of the bowl and including a wall that extends inwardly and in the direction of rotation of the bowl and is vertically tilted so that material that is entrained in the upwardly flowing air and is moving in the direction of rotation of the bowl will be directed downwardly and inwardly toward the lower portion of the associated roller upon striking said wall, circumferential liners secured to the wall of the housing and positioned above and adjacent to said annular passage, said liners extending generally intermediate adjacent rollers and being formed with an inner surface the lower portion of which is vertical and connects with the outer wall of the annular passage and the upper portion of which slopes inwardly from said lower portion causing the upwardly flowing air and entrained material to be deflected inwardly of the housing, and arcuate restrictor means placed at the outlet of said annular passage substantially inhibiting flow therethrough, said restrictor means extending in the direction of rotation of the bowl from a point adjacent the deflectors to a point slightly beyond the center of the rollers.

4. A pulverizing mill comprising an upright housing through which air is adapted to flow in an upward direction, a grinding bowl mounted within said housing for rotation about its vertically disposed longitudinal axis, said bowl having its periphery spaced from the housing wall to form an annular passage for the upward flow of air, a plurality of symmetrically arranged grinding rollers disposed to cooperate with a grinding surface formed on the inner surface of said bowl to grind material therebetween, deflector members mounted on said housing above and closely adjacent said annular passage, said deflectors being positioned immediately before each of the rollers relative to the direction of rotation of the bowl and including a wall that extends inwardly and in the direction of rotation of the bowl and is vertically tilted so that the material that is entrained in the upwardly flowing air and is moving in the direction of rotation of the bowl will be directed downwardly and inwardly toward the lower portion of the associated roller upon striking said wall, circumferential liners secured to the wall of the housing and positioned above and adjacent to said annular passage, said liners extending generally intermediate adjacent rollers and being formed with an inner surface of which is vertical and connects with the outer wall of the annular passage and the upper portion of which slopes inwardly from said lower portion causing the upwardly flowing air and entrained material to be deflected inwardly of the housing, arcuate restrictor means placed at the outlet of said annular passage substantially inhibiting flow therethrough, said restrictor means extending in the direction of rotation of the bowl from a point adjacent the deflectors to a point slightly beyond the center of the rollers, and vanes positioned in the unrestricted portion of the annular passage and tilted to deflect the upwardly moving air in the direction of rotation of the bowl.

5. In a pulverizing mill of the type described the combination of an upright housing through which air is adapted to flow in an upward direction, a grinding bowl mounted within said housing for rotation about its vertically disposed longitudinal axis, said bowl having its periphery spaced from the housing wall to form an annular passage for the upward flow of air and being provided with a downwardly sloping and outwardly extending annular surface at its central portion and an upwardly sloping and outwardly extending grinding surface starting adjacent the outer edge of said annular surface and extending to the side wall of the bowl, a plurality of radial vanes upstanding from said annular surface, a plurality of symmetrically arranged grinding rollers disposed to cooperate with said grinding surface to grind material therebetween, deflector members mounted on said housing above and closely adjacent said annular passage, said deflectors being positioned immediately before each of the rollers relative to the direction of rotation of the bowl and including a wall that extends inwardly and is vertically tilted so that material that is entrained in the upwardly flowing air and is moving in the direction of rotation of the bowl will be directed downwardly and inwardly toward the lower portion of the associated roll upon striking said wall, and circumferential liners secured to the wall of the housing and positioned above and adjacent said annular passage, said liners extending generally intermediate adjacent rollers and being formed with an inner surface the lower portion of which is vertical and forms a general continuation of the outer wall of the annular passage and the upper portion of which slopes inwardly from said lower portion causing the upwardly flowing air and entrained material to be deflected inwardly of the housing.

6. A pulverizing apparatus comprising in combination a housing, an upwardly open bowl mounted in said housing for rotation about its axis and providing an annular opening between the periphery of the bowl and the wall of the housing upwardly through which air is adapted to flow, said bowl having the upper portion of its periphery sloping upwardly and inwardly, the upper portion of the outer wall of said annular opening also sloping upwardly and inwardly in generally parallel relation with the upper portion of said periphery, a plurality of symmetrically arranged members in said bowl for pulverizing material fed to said bowl, and arcuate liner members positioned adjacent the wall of the housing with their inner surface extending upwardly from the outer wall of said annular opening, said liners extending intermediate adjacent pulverizing means and having the lower portion of their inner surface vertical and the upper portion sloped inwardly and upwardly.

7. A pulverizing apparatus comprising in combination a housing, an upwardly open bowl mounted in said housing for rotation about its axis and providing an annular opening between the periphery of the bowl and the wall of the housing upwardly through which air is adapted to flow, said bowl having the upper portion of its periphery sloping upwardly and inwardly, the upper portion of the outer wall of said annular opening also sloping upwardly and inwardly in generally parallel relation with the upper portion of said periphery, a plurality of symmetrically arranged members in said bowl for pulverizing material fed to said bowl, arcuate liner members positioned adjacent the wall of the housing with their inner surface extending upwardly from the outer wall of said annular opening, said liner extending intermediate adjacent pulverizing means and having the lower portion of their inner surface vertical and the upper portion sloped inwardly and upwardly, deflector members positioned above said annular opening and immediately upstream of said pulverizing members relative to the direction of rotation of the bowl, said deflectors being constructed and arranged to deflect material into said bowl adjacent the associated roller, means restricting said annular passage for arcuate distances extending from each deflector member in the direction of rotation of the bowl to a point adjacent the central portion of the adjacent pulverizing member, and deflector vanes positioned in the unrestricted portions of the annular passage and operative to direct the upward flowing air in the direction of rotation of the bowl.

8. A pulverizing apparatus comprising in combination a housing, an upwardly open bowl mounted in said housing for rotation about its axis and providing an annular opening between the periphery of the bowl and the wall of the housing upwardly through which air is passed, a plurality of symmetrically arranged grinding members in said bowl adapted to coact with a grinding surface formed in the bowl to pulverize material fed to the bowl, deflector members positioned above said annular opening and immediately before each of the grinding members relative to the direction of rotation of the bowl and including a wall that extends inwardly and in the direction of rotation of the bowl and is vertically tilted so that material that is entrained in the upwardly flowing air and is moving in the direction of rotation of the bowl will be directed downwardly and inwardly toward the lower portion of the associated grinding member upon striking said wall.

9. A pulverizing apparatus as defined in claim 8 wherein the inner surface of the housing immediately above the annular passage includes arcuate surfaces that extend generally intermediate adjacent grinding members with the lower portion of these surfaces being vertical and generally forming a continuation of the outer wall of the annular passage and the upper portion extending upwardly and inwardly from said lower portion causing the upwardly flowing air and entrained material to be deflected inwardly of the housing.

References Cited in the file of this patent

UNITED STATES PATENTS

| Number | Name | Date |
|---|---|---|
| 1,332,220 | Kutsche | Mar. 2, 1920 |
| 1,806,980 | Kreutzberg | May 26, 1931 |
| 2,431,746 | Frangquist | Dec. 2, 1947 |

FOREIGN PATENTS

| Number | Country | Date |
|---|---|---|
| 249,300 | Germany | July 16, 1912 |